No. 771,795. PATENTED OCT. 4, 1904.
W. T. GILMOR.
METHOD OF MAKING BREAD WITHOUT CRUST.
APPLICATION FILED JAN. 11, 1902.
NO MODEL. 2 SHEETS—SHEET 1.
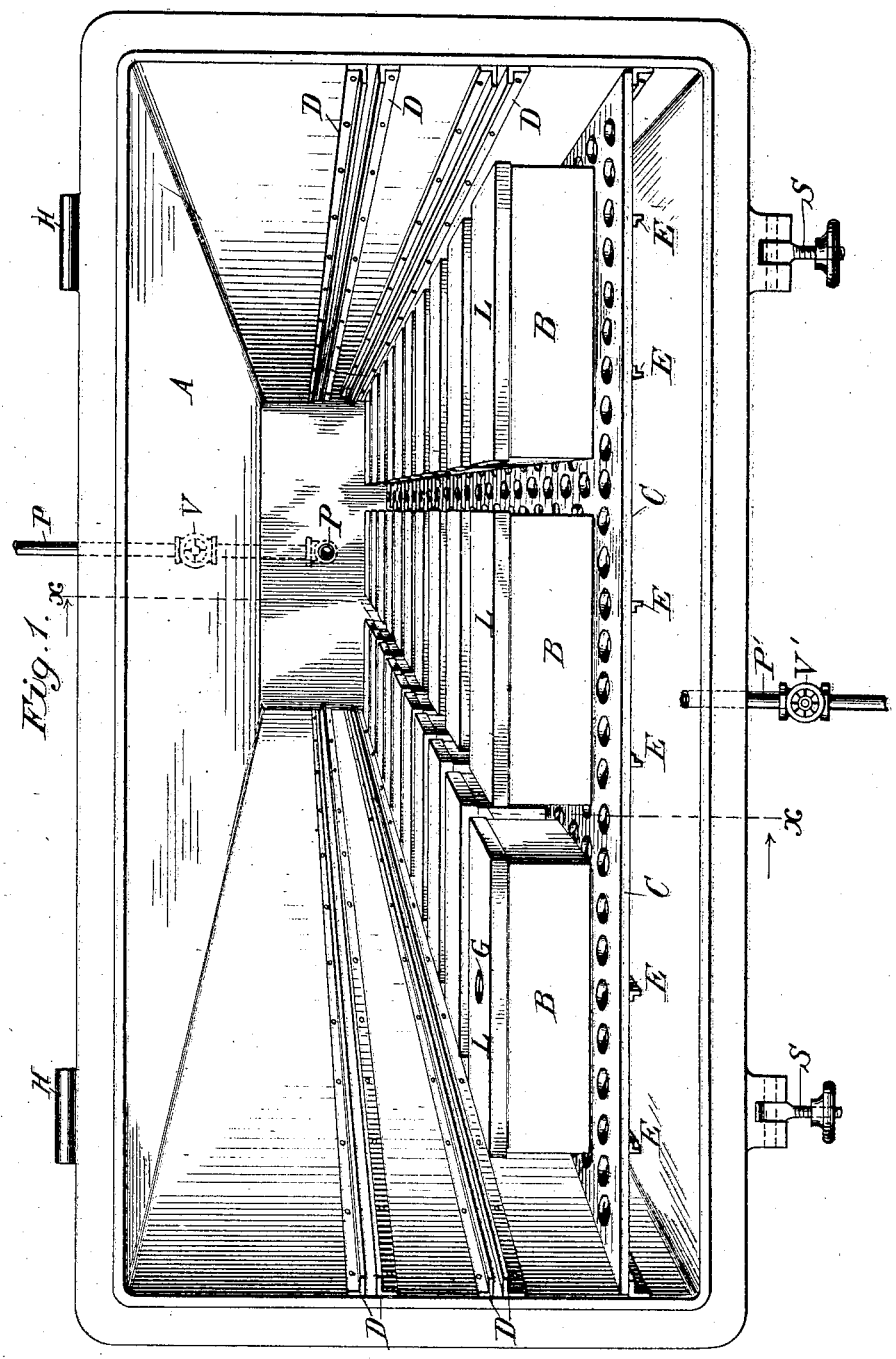

No. 771,795. PATENTED OCT. 4, 1904.
W. T. GILMOR.
METHOD OF MAKING BREAD WITHOUT CRUST.
APPLICATION FILED JAN. 11, 1902.
NO MODEL. 2 SHEETS—SHEET 2.
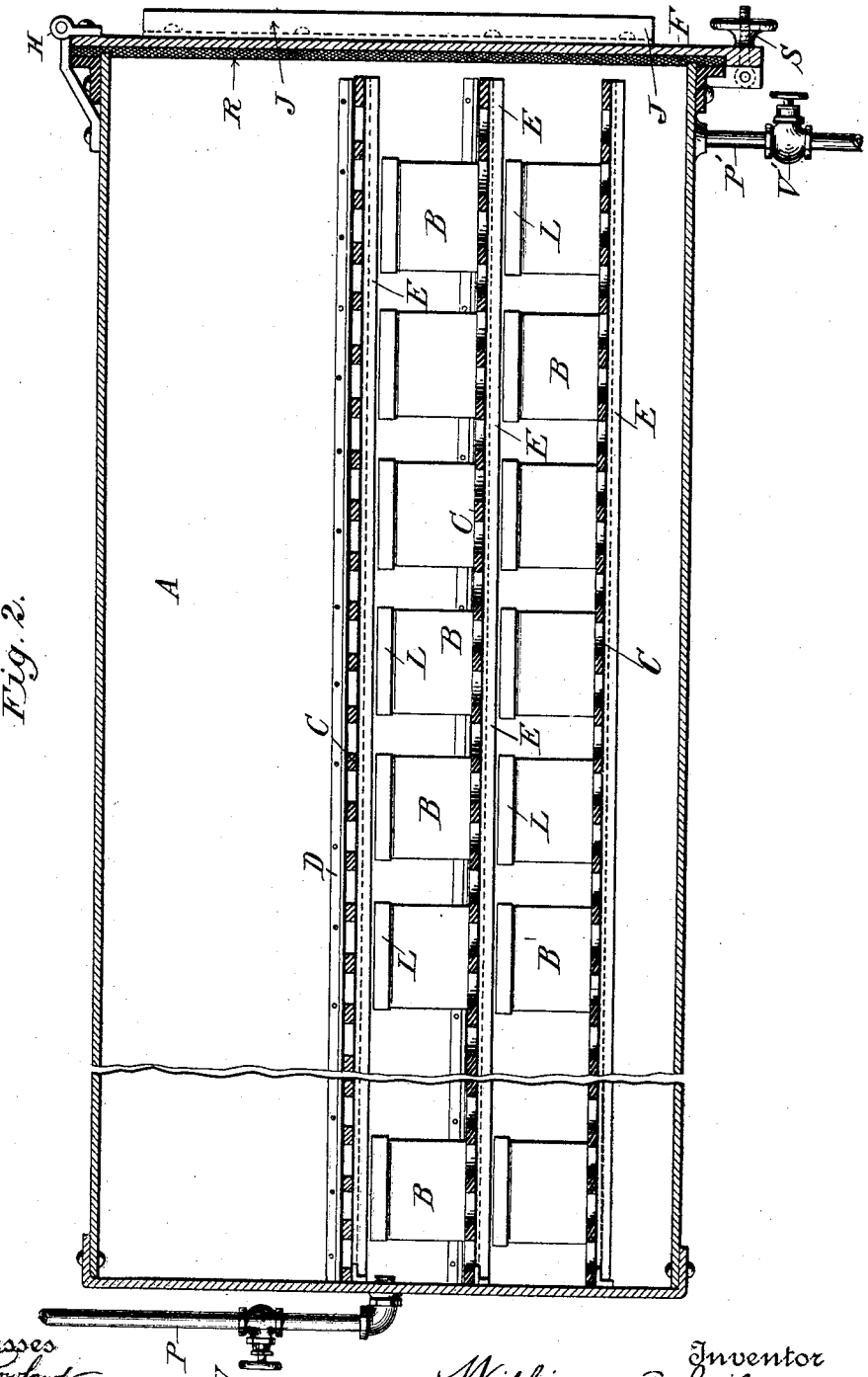

No. 771,795.

Patented October 4, 1904.

UNITED STATES PATENT OFFICE.

WILLIAM T. GILMOR, OF JERSEY CITY, NEW JERSEY, ASSIGNOR, BY MESNE ASSIGNMENTS, TO EMPIRE STATE TRUST COMPANY, TRUSTEE, A CORPORATION OF NEW YORK.

METHOD OF MAKING BREAD WITHOUT CRUST.

SPECIFICATION forming part of Letters Patent No. 771,795, dated October 4, 1904.

Application filed January 11, 1902. Serial No. 89,290. (No specimens.)

*To all whom it may concern:*

Be it known that I, WILLIAM T. GILMOR, a citizen of the United States, residing at Jersey City, county of Hudson, and State of New Jersey, have made a new and useful Invention in the Nature of a Method of Making Bread Without Crust, of which the following is a specification.

My invention has for its object the making of loaf or light bread without a crust.

Many persons prefer that portion of loaf or light bread which has no substantial crust. It is also a well-known fact that in the making of sandwiches in large restaurants, hotels, &c., it is customary to always trim off the crust of sliced loaf or light bread before the sandwiches are finally completed. Such a practice necessarily results in the waste of a very large amount of the bread.

My invention contemplates the making of loaf or light bread without crust and of such a nature that the entire exterior of the loaf is of substantially the same color or appearance.

To this end my invention consists in the hereinafter-described novel methods of making such bread.

My invention will be fully understood by referring to the accompanying drawings and to the following specification descriptive thereof, the essential points of novelty being particularly pointed out in the claims at the end of the specification.

Figure 1 is a perspective view illustrating the preferred apparatus for practicing my novel method of making crustless bread, together with a series of pans or vessels inclosed therein, the door of the apparatus, however, being removed for the purpose of more clearly illustrating the entire interior structure. Fig. 2 is a longitudinal sectional view of the entire apparatus, taken through Fig. 1 on the broken line $x\ x$ and as seen looking at that figure of the drawings from left to right in the direction of the arrows, three trays and two tiers of pans or vessels, however, being shown in this view.

Referring now to the drawings in detail in both of the figures, of which like letters of reference represent like parts wherever used, A represents a rectangular-shaped chamber, made, preferably, of sheet-steel plates riveted together at the joints and made steam-tight, said chamber being provided with a door F, having stiffening-ribs J, hinges H H at the upper side thereof, and pivoted screw-clamps S S at the lower side, R being a rubber or steam-tight gasket adapted to effectually close the chamber, so as to prevent any escape of steam when the door is closed and secured by said clamps.

P represents a steam-pipe for admitting steam to the chamber, and V a cock in said pipe, P' being an outlet-pipe, and V' a cock therefor.

D D, D D, D D represent guideways secured to the inner faces of the chamber, and C C C perforated metal trays having stiffening-ribs E E E on their lower surfaces, there being only one of said trays shown in Fig. 1 and three in Fig. 2 of the drawings.

B B B represent bread-pans, made, preferably, of tin or sheet-iron and provided with closely-fitting lids L L L. One or more of the outer tier of pans is or are provided with a hole or opening G in the lid for the purpose of observing when the dough is properly proofed, as will be described in connection with the description of the method of operation, which is as follows: Dough to the required amount, such as is ordinarily used in making loaf or light bread, is placed in the several bread-pans B and the lids L carefully secured in place thereon. They are then equally distributed upon one of the trays C and slid into position with said tray in the manner shown in Fig. 1, the pan B with the "proof-opening" being in the outer tier or row next the door. If it is desired to fill the entire chamber, additional pans are in like manner partially filled with dough, covered and placed upon the several trays, which are inserted in the same manner in the guideways D D, the arrangement being such that when all of the trays, with their supported pans, are in position the lower edges of the ribs E E beneath each of the trays rest a slight distance above the lids L of the pans in such manner as to prevent said lids from rising. The door F is now closed and firmly secured in place by the screw-clamps S S, after which the cock V' is closed in the pipe P' and the cock V opened and steam allowed to enter through the pipe P until the pressure (indicated by any well-known pressure-indicator) reaches about three pounds. This pressure is continued a definite time until it is thought that the dough in the pans has reached the desired condition of proofing, which will be ascertained by opening the door from time to time and inserting the forefinger in the opening G. After the dough is thus proofed the door is again closed and securely locked by the clamps S S and the steam turned on through the pipe P at the desired pressure, preferably from ten to twenty pounds. The increased heat will cause the dough to rise still further until the pans are completely filled, so that the entire heating effect of the steam is now wholly through the walls and covers of the pans. This pressure is continued until the bread is cooked, which will be ascertained by closing the cock V and opening the cock V' and door F and examining the bread in the pan B through the proof hole or opening G. I have found that in ordinary cases the bread will thus cook in from twenty to thirty minutes with a pressure of from ten to twenty pounds. However, the speed with which the bread will cook will depend, of course, upon the pressure or temperature. A very notable feature about this manner of making bread is that no matter how long it may be left in the pans in the chamber and subjected to the action of the steam it will not burn or char, and this constitutes a feature of importance in that it avoids the necessity of opening the chamber or requiring the close attention of the attendant. By such a process I am enabled to make bread without any crust whatever, the bread when removed from the pans B being white when white flour is used and having a very thin paper-like exterior coating, which makes it very palatable and readily adapted for use in making sandwiches, where such bread is now extensively used.

In the practice of the method or process hereinbefore described I do not limit the same to the use of the specific apparatus herein shown and described, said apparatus being the best now known to me for effecting the results sought.

I believe it is broadly new with me to inclose dough in a substantially tight baking-pan and subject the same to the action of steam until cooked, said steam coming in contact with substantially all parts of the exterior surface of the pan only, and my claims hereinafter made as to this method or process are generic in this respect. I believe it is also new with me to first proof dough in confined vessels or pans by subjecting it to the action of steam at relatively low temperature and to subsequently complete the making of the bread by subjecting it to still further heat from steam.

I am aware that bread has heretofore been baked in inclosed vessels by subjecting the same to a baking heat in an ordinary oven; but I am not aware that any one has heretofore made a crustless bread by first partially filling baking-pans with dough, placing the covers thereon, then proofing the dough until the entire interior of the inclosing pan is filled with the dough, and then subjecting the same to the action of steam, the heat whereof is imparted to the dough only through the medium of the inclosing baking-pans, and this process constitutes the essence of my invention in that it produces an absolutely novel product in the nature of a crustless loaf of bread of which the exterior surface is substantially the same color and appearance as the interior thereof.

I make no claim hereinafter to the product which results from the practice of the method or process hereinbefore described and hereinafter claimed, as the same constitutes the subject-matter of a divisional application bearing Serial No. 98,690, filed by me in the United States Patent Office on the 17th day of March, 1902.

Having thus described my invention, what I claim, and desire to secure by Letters Patent of the United States, is—

1. The described method or process of making loaf or light bread without crust, consisting in first proofing the dough in an inclosed vessel until it entirely fills the interior thereof and is in actual contact with every portion thereof, and then subjecting said inclosed vessel and the dough contained therein to the further action of steam, so that the cooking action of the steam is transmitted to the dough only through the walls of the containing vessel.

2. The described method or process of making loaf or light bread without crust, consisting in confining the dough in an inclosed vessel and subjecting the same to a sufficient amount of heat to proof it until the vessel is entirely filled therewith, and in further subjecting the same in the inclosed vessel to the action of the steam at higher temperature until sufficient heat has been transmitted through the walls of the vessel to obtain the desired result.

3. The described method of making crustless loaf or light bread, consisting in subjecting the dough to a proofing process due to the action of steam in an inclosed pan or vessel until it fills the entire inner surface thereof, and then cooking the bread until done by the action of steam at higher temperature and wholly upon the outer surface of the vessel, said proofing and cooking both being effected in the same heating-chamber and without removal of the material therefrom.

In testimony whereof I have signed my name to this specification in the presence of two subscribing witnesses.

WILLIAM T. GILMOR.

Witnesses:
OWEN T. BUGG,
CHARLES J. KINTNER.